United States Patent
Persaud et al.

(10) Patent No.: US 8,745,384 B2
(45) Date of Patent: Jun. 3, 2014

(54) SECURITY MANAGEMENT IN A GROUP BASED ENVIRONMENT

(75) Inventors: Andrew Persaud, San Jose, CA (US); Kavitha Kamarthy, Milpitas, CA (US); Shree Murthy, San Jose, CA (US); Scott Fanning, Morgan Hill, CA (US); David A. McGrew, Poolesville, MD (US); Thirunavukkarasu Suresh, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 134 days.

(21) Appl. No.: 13/207,775

(22) Filed: Aug. 11, 2011

(65) Prior Publication Data

US 2013/0042106 A1    Feb. 14, 2013

(51) Int. Cl.
*H04L 29/06*    (2006.01)

(52) U.S. Cl.
USPC ........... 713/165; 713/168; 713/169; 713/170; 726/1; 726/2; 726/3; 726/4; 726/17; 726/21; 726/27

(58) Field of Classification Search
USPC ........... 713/165, 168–170; 711/163; 726/1–4, 726/17, 21, 27
See application file for complete search history.

(56) References Cited

U.S. PATENT DOCUMENTS

| 7,567,510 B2 | 7/2009 | Gai et al. |
| 2009/0034557 A1 | 2/2009 | Fluhrer et al. |
| 2009/0094457 A1* | 4/2009 | Lapstun et al. ............... 713/168 |
| 2011/0022812 A1* | 1/2011 | van Der Linden et al. ... 711/163 |

OTHER PUBLICATIONS

"Understanding Security in Cloud Storage", Nasuni Corporation, 2010, 16 pages.

* cited by examiner

*Primary Examiner* — Thanhnga B Truong
(74) *Attorney, Agent, or Firm* — Edell, Shapiro & Finnan, LLC (57) ABSTRACT

Techniques are provided for securely storing data files in, or retrieving data files from, cloud storage. A data file transmitted to cloud storage from a client in an enterprise computing environment is intercepted by at least one network device. Using security information received from a management server, the data file is converted into an encrypted object configured to remain encrypted while at rest in the cloud storage.

24 Claims, 8 Drawing Sheets

SECURITY MANAGEMENT IN A GROUP BASED ENVIRONMENT

TECHNICAL FIELD

The present disclosure relates to techniques for managing security in a distributed, group based environment.

BACKGROUND

As data storage demands have increased, a new trend in data storage, referred to as cloud storage, has emerged. Cloud storage generally comprises multiple servers (physical and/or virtual) that are hosted external to a computing enterprise, and which are accessible to the enterprise through a Wide Area Network (WAN). The cloud storage is generally hosted by a third party service provider, and storage may be purchased for use by the enterprise on an as-needed basis. This allows for expansion of storage capacity without the costs of adding dedicated storage servers in the enterprise.

DESCRIPTION OF EXAMPLE EMBODIMENTS

Overview

Techniques are provided for securely storing data files in, or retrieving data files from, cloud storage. More particularly, a data file transmitted to cloud storage from a client in an enterprise computing environment is intercepted by at least one network device. Using security information received from a management server, the data file is converted into an encrypted object configured to remain encrypted while at rest in the cloud storage.

Example Embodiments

Figure 1:
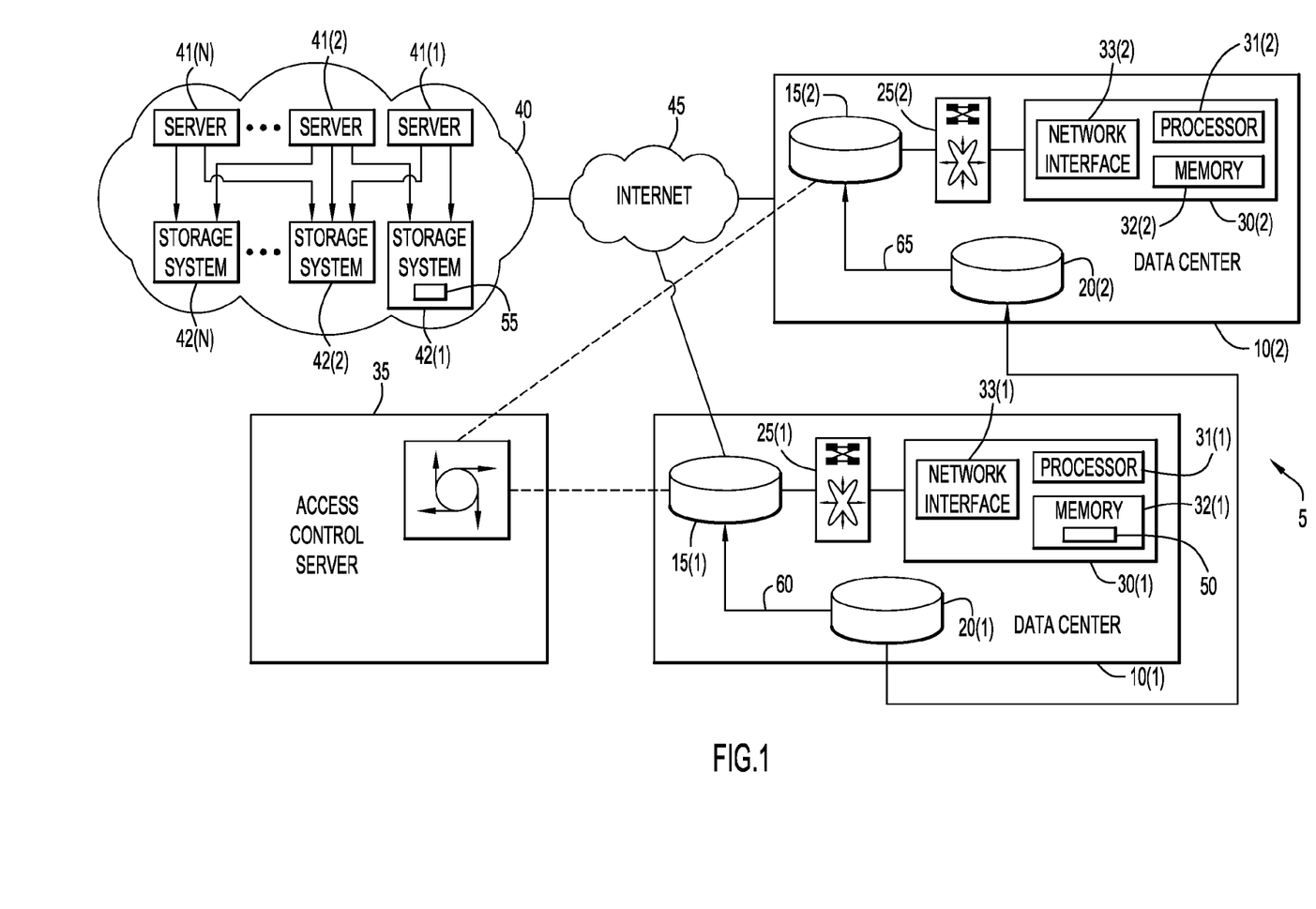
FIG. 1 is a schematic diagram of a computing enterprise comprising multiple data centers configured to use group based security techniques to store data files in, or retrieve data files from, a cloud storage.

FIG. 1 is a schematic diagram of an example computing enterprise 5 implementing group based security techniques as described herein. Enterprise 5 comprises two data centers 10(1)-10(2) each including a network device 15(1) and 15(2), respectively, a management server 20(1) and 20(2), respectively, a switch 25(1) and 25(2), respectively, and a client 30(1) and 30(2), respectively. Each client 30(1) and 30(2) includes a processor 31(1) and 31(2), respectively, memory 32(1) and 32(2), respectively, and a network interface unit 33(1) and 33(2), respectively. In this arrangement, enterprise 5 further includes an access control server 35. As detailed below, elements of enterprise 5 are configured to implement group based security techniques in which data files are securely stored in, or retrieved from, cloud storage 40 through the Internet 45.

In the example of FIG. 1, data centers 10(1) and 10(2) are disposed at geographically distributed locations, but are substantially similar. For ease of reference, storage of data files will be described with reference to data center 10(1), while retrieval of date files will be described with reference to data center 10(2).

Client 30(1) in data center 10(1) is a device configured to generate, receive and/or access data files for storage in cloud storage 40. Cloud storage 40 comprises, for example, a plurality of servers 41(1)-40(N) (physical and/or virtual) and data storage systems 42(1)-42(N) that are hosted external to a computing enterprise, and which are accessible to the enterprise through a Wide Area Network (WAN). The cloud storage 40 is generally hosted by a third party service provider, and storage may be purchased for use by the enterprise on an as-needed basis. Client 30(1) may be, for example, a computer (desktop, laptop, etc.), mobile device, server, etc. A data file 50 is initially accessed from memory 32(1) in client 30(1) using processor 31(1). Data file 50 is then forwarded to network device 15(1) via network interface unit 33(1) and switch 25(1).

Network device 15(1) is a device configured to operate with cloud storage Application Program Interfaces (APIs) in order to store data in cloud storage 40 via a network connection, such as a Local Area Network (LAN) or Wide Area Network (WAN). Network device 15(1) may be a secure storage gateway or router. Network devices 15(1) and 15(2) will be referred to herein as secure routers.

In certain networks, data in motion (i.e., data that is traversing a network) is secured using the Transport Layer Security (TLS) protocol, the Secure Sockets Layer (SSL) protocol, or the like. However, in such techniques, the data is only secure during the actual transmission, and is not secured as data at rest. Data at rest refers to data that is not in motion or temporarily residing in computer memory to be read or updated. Data at rest may include archived data or reference files, data files stored on hard drives, files on backup medium, files stored in a storage area network (SAN), etc. Secure router 15(1), along with management server 20(1), enable new techniques for securing data file 50 while at rest in cloud storage 40.

Before storage of data file 50 into cloud storage 40, secure router 15(1) use cryptographic algorithms to convert data file 50 into an encrypted object 55 that, as described further below, includes the encrypted data and other information. More specifically, secure router 15(1) generates a unique random key per data file, and secures the file using this key. Also as described further below, the random file encrypting key may also be encrypted using a master key provided by management server 20(1).

The encryption operations are based on security information 60 provided to secure router 15(1) by management server 20(1). As used herein, security information may include, but is not limited to, encryption/decryption information, including encryption keys, access control polices, etc. The policies within the security information may also contain information about the services that may be applied on files or directories, like encryption, compression, local caching, retention values, etc.

Returning to FIG. 1, the random file encrypting key, generally in the encrypted format, is included in a metadata header generated by secure router 15(1). That is, the metadata header contains a keyed/token that identifies which key/encryption algorithm was used to encrypt the unique random key. In certain circumstances, there is one to one mapping of the master key to keyed/token, while in other circumstances, the same master key may be used to encrypt multiple different file encrypting keys, thus a master key is mapped to multiple keyed/tokens.

The metadata header is then attached to the encrypted version of data file 50. As such, the metadata header and the encrypted version of data file 50 collectively comprise encrypted object 55 that is stored in cloud storage 40 (more particularly, a storage system 42(1)-42(N)). Encrypted object 55 is generated such that it maintains its encrypted format during transmission to cloud storage 40 and while at rest in the cloud storage. Data file 50 is not decrypted until it moves from cloud storage 40 back to enterprise 5. Further details of the encryption process and the generation of an encrypted object are provided below with reference to FIG. 6.

As detailed below, prior to encrypting data file 50, secure router 15(1) first authenticates client 30(1) to ensure that the client has permission to store data file 50 in the cloud storage. Secure router 15(1) authenticates client 30(1) locally using security information 60 received from management server 20(1), or secure router 15(1) authenticates client 30(1) with the assistance of management server 20(1). In certain circumstances, once the identity of a client is determined through this authentication, the identity of the client may be maintained by the management server 20(1).

Once encrypted object 55 is stored in cloud storage 40, the data file 50 contained therein may be later retrieved by a client, such as client 30(2), in enterprise 5. More particularly, processor 31(2) in client 30(2) generates a request for the data file 50 that is forwarded to secure router 15(2) via network interface unit 33(2) and switch 25(2). Prior to processing this request, secure router 15(2) first authenticates client 30(2) to ensure that the client has permission to read the data file 50. Secure router 15(2) authenticates client 30(2) locally using security information 65 received from management server 20(2), or secure router 15(2) authenticates client 30(2) with the assistance of management server 20(2). Further details regarding the authentication of a client are provided in greater detail below.

Following proper authentication, secure router 15(2) obtains encrypted object 55 from cloud storage 40. More specifically, secure router 15(2) will check the location of the data file 50 using its local cache. If the location of the file cannot be found, secure router 15(2) will send a request to management server 20(2) to obtain the file location. Once the file location is obtained, secure router 15(2) may store the location in its cache for faster access in the future. Secure router 15(2) then sends a request for the object 55 to cloud storage 40.

After encrypted object 55 is received, secure router 15(2) decrypts the object using security information 65 received from management server 20(2), and forwards data file 50 to client 30(2). In other words, secure router 15(2) will apply policies for decryption, decompression, etc., in order to extract the original data file 50 from encrypted object 55. This extraction is performed using the random file generating key stored in the header of object 55 and, if the random key is also encrypted, the master key noted above. Data file 50 may be used by client 30(2) for one or more operations and/or may be stored in memory 32(2). The authentication of clients and the decryption of objects using security information are described in greater detail below.

As noted above, secure routers 15(1) and 15(2) operate with management servers 20(1) and 20(2) to authenticate clients 30(1) and 30(2). Before such operations occur, secure routers 15(1) and 15(2) are authenticated by management servers 20(1) and 20(2), respectively, to verify that the routers are enabled and allowed to implement the desired security techniques. This initial authentication includes registration of secure routers 15(1) and 15(2) as members of a class or group of devices, referred to herein as an access group, that use the same security information. More specifically, management servers 20(1)-20(2) maintain and manage different sets of security information that are each used by different groups of devices. These groups may include, for example, a group of devices that use one particular or type of master key to encrypt data files, or a group of devices that enforce access policies differently than a second group. Secure routers 15(1) and 15(2) are configured to initially register with management servers 20(1) and 20(2), respectively, as a member of one of the different groups. The initial group registration determines, for example, what type of encryption will be used by the router, what encryption keys (master keys) should be used to encrypt randomly generated file encrypting keys, how clients should be authenticated, etc. As such, each group has different access policies that are enforced or carried out by secure routers 15(1) and 15(2).

The example of FIG. 1 has been described with reference to the authentication of clients 30(1) and 30(2) by secure routers 15(1) and 15(2), respectively, optionally with the assistance of management servers 20(1) and 20(2), respectively. In certain circumstances, the authentication is not controlled by management servers 20(1) and 20(2), but rather by a separate access control server 35. Access control server 35 is a separate appliance (i.e., separate from management servers 20(1) and 20(2)) that is configured to communicate directly or indirectly with secure routers 15(1) and 15(2). In such circumstances, when authentication of clients 30(1) and 30(2) is desired, the access control or authentication information may be retrieved by secure routers 15(1) and 15(2) from access control server 35 rather than from management servers 20(1) and 20(2). Access control server 35 may initially receive the authentication information from one or more of management servers 20(1) and 20(2), and one of the management servers 20(1) and 20(2) may also selectively provision the authentication control to access control server 35 as desired. Management servers 20(1) and 20(2) also notify secure routers 15(1) and 15(2), respectively, that authentication should be requested from access control server 35.

FIG. 1 also illustrates an example arrangement comprising two management servers 20(1) and 20(2), one in each data center 10(1) and 10(2). The management servers 20(1) and 20(2) are configured to communicate with one another for various reasons including, for example, to exchange security or other types of information. It should be appreciated that the use of two management servers 20(1) and 20(2) in the example of FIG. 1 is merely illustrative. For example, in other circumstances only one management server (e.g., server 20(1)) may be used. In such circumstances, management server 20(1) may communicate and provide security information to both secure routers 15(1) and 15(2), regardless of the router's physical location. In other words, a single management server 20(1) may communicate with routers in other data centers.

FIG. 1 is also an example of an enterprise including two data centers 10(1) and 10(2). It would be appreciated that, in other circumstances, a greater number of data centers may be used and enabled as described above with reference to data centers 10(1) and 10(2). It would also be appreciated that these techniques may also be implemented in an enterprise including a data center.

As noted above, during operation subsequent to the initial registration, secure routers 15(1) and 15(2) will authenticate clients 30(1) and 30(2), respectively, upon requests received there from. As such, in the example of FIG. 1, there are two different authentications that occur; the authentication of clients 30(1) and 30(2) during storage/retrieval of data, and the initial authentication of secure routers 15(1) and 15(2) and registration thereof to a specific access group.

In summary of the above, management servers 20(1) and 20(2) provide centralized authentication of network devices (secure routers 15(1) and 15(2)) prior to operation and centralized management and distribution of security information (i.e., central management and distribution of access policies, keys, etc.). Additionally, secure routers 15(1) and 15(2) are configured to intercept data files based on security polices downloaded from management servers 20(1) and 20(2), verify access of clients 30(1) and 30(2) before processing requests there from, and, as described below, provide abstraction of cloud storage services and support multi-tenant environments. Further details of the authentication are provided below.

Figure 2:
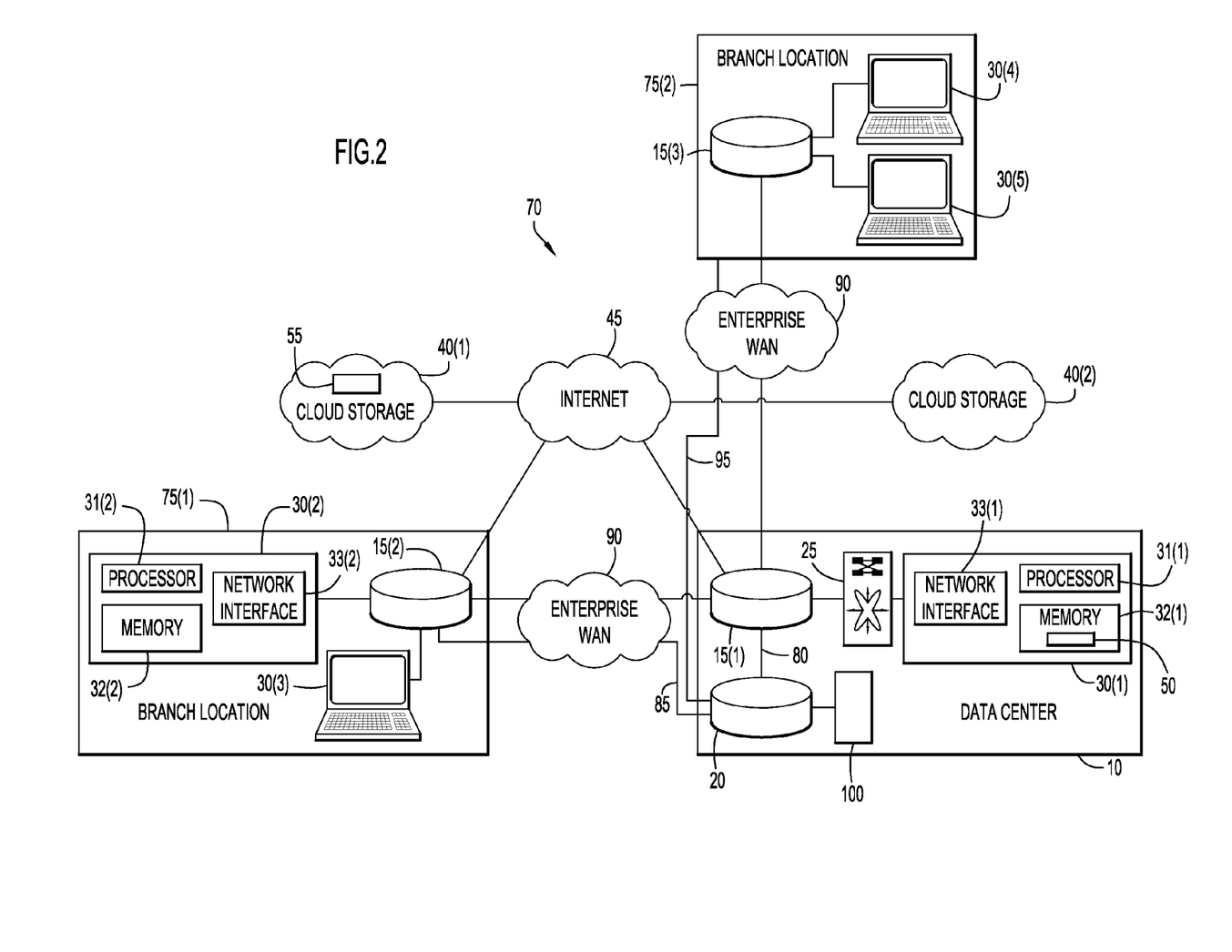
FIG. 2 is a schematic diagram of a computing enterprise comprising a data center and multiple branch locations configured to use group based security techniques to store data files in, or retrieve data files from, cloud storage.

FIG. 2 is a schematic diagram of another computing enterprise 70 implementing security techniques as described herein. Enterprise 70 comprises a data center 10 including a secure router 15(1), a management server 20, a switch 25, and a client 30(1). Client 30(1) comprises a processor 31(1), memory 32(1) and a network interface unit 33(1). In this arrangement, enterprise 70 further includes two branch locations 75(1) and 75(2) each comprising a secure router 15(2) and 15(3), respectively, and clients 30(2) and 30(3) (branch location 75(1)) and clients 30(4) and 30(5) (branch location 75(2)). As detailed below, elements of enterprise 70 are configured to securely store data files in, or retrieve data files from, cloud storage through the Internet 45. FIG. 2 is an example in which the accessed cloud storage includes two geographically distributed storage locations 40(1) and 40(2). For ease of reference, the two storage locations will be collectively referred to herein as cloud storage 40.

In the example of FIG. 2, data center 10 and branch locations 75(1) and 75(2) are disposed at geographically distributed locations. Clients 30(1) and 30(5) may be, for example, computers, mobile devices, servers, etc. All clients 30(1) and 30(5) are configured to store data files in, or retrieve data files from, cloud storage 40. However, for ease of reference, data file storage will be described with reference to client 30(1) in data center 10, while data file retrieval will be described with reference to client 30(2) in branch location 75(1).

Similar to the example of FIG. 1, data center 10 includes a client 30(1) configured to generate, receive or access data files for storage in cloud storage 40. In this example, a data file 50 is initially accessed from memory 32(1) using processor 31(1). Data file 50 is then forwarded to secure router 15(1) via network interface unit 33(1) and switch 25. Secure router 15(1), along with management server 20, enable new techniques for securing data file 50 while at rest in cloud storage 40.

Before storage of data file 50 into cloud storage 40, secure router 15(1) is configured to convert the data file into an encrypted object 55. More specifically, secure router 15(1) encrypts data file 50 using a random file encrypting key generated by the router. Optionally, the random file encrypting key may also be encrypted using security information received from management server 20.

The random file encrypting key, generally in the encrypted format, is included in a metadata header that is attached to the encrypted version of data file 50. This header and the encrypted version of data file 50 collectively comprise an encrypted object 55 that is stored in cloud storage 40. Encrypted object 55 is generated such that it maintains its encrypted format during transmission to cloud storage 40 and while at rest in the cloud. Further details of the encryption process and the generation of an encrypted object are provided below with reference to FIG. 6.

Prior to encrypting data file 50, secure router 15(1) first authenticates client 30(1) to ensure that the client has permission to store data file 50 in the cloud storage. Secure router 15(1) authenticates client 30(1) locally using security information 80 received from management server 20, or secure router 15(1) authenticates client 30(1) with the assistance of management server 20. Further details regarding the authentication of a client are provided in greater detail below.

Once encrypted object 55 is stored in cloud storage 40, the data file 50 contained therein may be later retrieved by one or more of clients 30(1)-30(5). To retrieve data file 50, processor 31(2) in client 30(2) generates a request for the data file that is forwarded to secure router 15(2) via network interface unit 33(2). Prior to processing this request, secure router 15(2) first authenticates client 30(2) to ensure that the client has permission to read data file 50. Secure router 15(2) authenticates client 30(2) locally using security information 85 received from management server 20, or secure router 15(2) authenticates client 30(2) with the assistance of management server 20.

Following proper authentication, secure router 15(2) obtains encrypted object 55 from cloud storage 40. Secure router 15(2) then decrypts object 55 using security information 85 received from management server 20, and forwards data file 50 to client 30(2). In other words, secure router 15(2) extracts the original data file 50 from the encrypted object. This extraction is performed using the random file generating key stored in the header of object 55 and, if the random key is also encrypted, the master key noted above. Data file 50 may be used by client 30(2) for one or more operations and/or stored in memory 32(2). The authentication of clients and the decryption of objects using security information are described in greater detail below.

As noted above, secure routers 15(1)-15(3) operate with management server 20 to store/retrieve data files, and to authenticate clients 30(1)-30(5). As noted above, before such operations occur, secure routers 15(1)-15(3) are authenticated by management server 20 to verify that the routers are enabled and allowed to implement the desired security techniques. This initial authentication includes registration of secure routers 15(1)-15(3) with management server 20 as a member of a class or group of devices, referred to herein as an access group, as described above with reference to FIG. 1. As noted, each access group has different access policies that are enforced or carried out by secure routers 15(1)-15(3).

The example of FIG. 2 has been described with reference to the authentication of clients 30(1) and 30(2) by secure routers 15(1) and 15(2) through the assistance of a management server 20 positioned in data center 10. Management server 20 communicates security information 85 to secure router 15(2) using the WAN 90 of enterprise 70. Similarly, management server 20 is also configured to provide security information 95 to secure router 15(3) via WAN 90. It would be appreciated that the use of one management server 20 in FIG. 2 is illustrative, and additional management servers may be added.

As noted, FIG. 2 illustrates examples in which authentication of a client is controlled by management server 20. However, it would be appreciated that, in certain circumstances, authentication of clients 30(1)-30(5) may be controlled by a separate access control server (not shown) as described above with reference to FIG. 1.

FIG. 2 is an example of an enterprise including two branch locations 75(1) and 75(2). It would be appreciated that, in other circumstances, a greater number of branch locations may be used and enabled as described above. It would also be appreciated that these techniques may be implemented in an enterprise including one branch location.

As noted above, security information is managed by management server 20, and, in certain circumstances security information, such as encryption keys, may be stored on the management server. However, in certain computing enterprises, the ability to store encryption keys is also present as a result of conventional security techniques. The example of FIG. 2 is designed to take advantage of this convention storage. More specifically, the conventional storage is shown in FIG. 2 as a key database 100. This key database 100 is an existing key storage device in the enterprise that the management server 20 uses for encryption key storage. The encryption keys may be stored in database 100 in an encrypted format or as clear-text. In certain circumstances, a global command-line interface (CLI) is provided on management server 20 to configure external database 100.

In summary of the above, management server 20 provides centralized authentication of network devices (secure routers 15(1)-15(3)) prior to operation and centralized management and distribution of security information management (i.e., central management and distribution of access policies, keys, etc.). Additionally, secure routers 15(1)-15(3) are configured to intercept data files based on security polices downloaded from management server 20, verify access of clients 30(1)-30(5) before processing requests there from, and, as described below, provide abstraction of cloud storage services and support multi-tenant environments.

Figure 3:
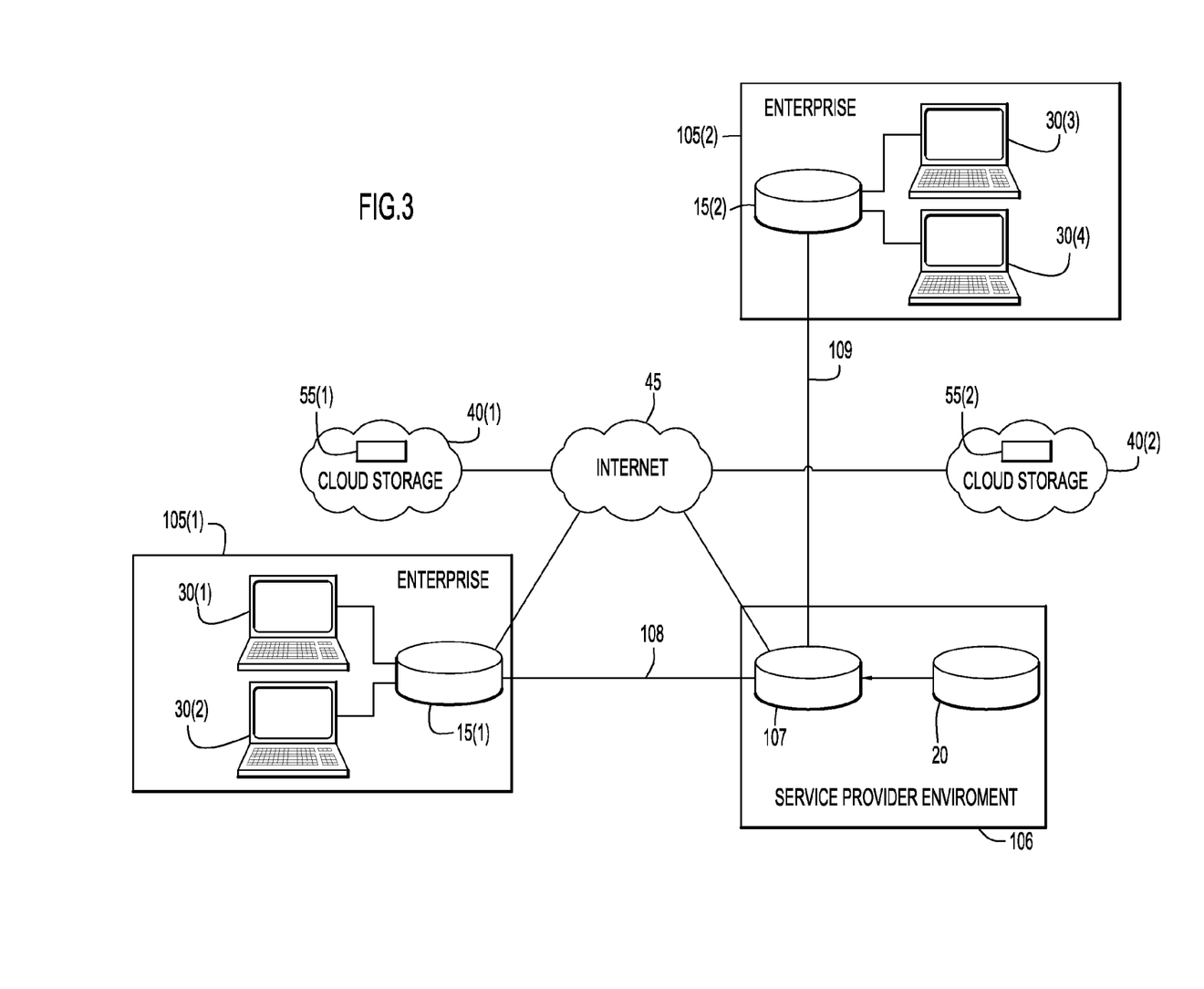
FIG. 3 is a schematic diagram of multiple enterprises configured to use group based security techniques to store data files in, or retrieve data files from, cloud storage.

FIG. 3 is an example in which two independent, geographically distributed enterprises 105(1) and 105(2) operate with a single management server 20 to store data files in, or retrieve data files from, cloud storage. Each enterprise 105(1) and 105(2) includes a secure router 15(1) and 15(2), respectively, and clients 30(1) and 30(2) (enterprise 100(1)) and clients 30(3)-30(4) (enterprise 100(2)). FIG. 3 is also an example in which cloud storage comprises two geographically distributed storage locations 40(1) and 40(2). For ease of reference, the two storage locations will be referred to simply herein as cloud storage 40.

In contrast to the examples of FIGS. 1 and 2, in the example of FIG. 3 management server 20 is hosted by a third-party in an environment 106 that is external to enterprises 100(1) and 100(2). The third-party may be the provider of cloud storage 40, or another party that controls security.

All clients 30(1)-30(5) are configured to store data in, or retrieve data from, cloud storage 40, as described above with reference to the clients of FIGS. 1 and 2. Clients 30(1)-30(4) may be, for example, computers, mobile devices, servers, etc.

As previously noted, network devices, such as routers 15(1) and 15(2), communicate with management servers, such as server 20, for a number of reasons, including authentication of the routers, authentication of clients, download of security information, etc. In the example of FIG. 3, this communication is enabled via the Internet 45 through a network device (router) 107 in environment 106.

Similar to the examples of FIGS. 1 and 2, secure routers 15(1) and 15(2) are authenticated by server 20 and are registered to a specific access group. However, in this example, routers 15(1) and 15(2) are each registered to different access groups. More specifically, it is important that the confidentiality of data files stored in cloud storage 40 is maintained with respect to non-authorized parties (i.e., outside parties that are not permitted to participate in data storage), but also between the two enterprises 105(1) and 105(2). As such, the security information 108 provided to secure router 15(1) in enterprise 105(1) includes a certain set of policies and encryption information, while security information 109 provided to secure router 15(2) in enterprise 105(2) includes another set of policies and encryption information. Due to the subsequent authentications of clients during data file storage or retrieval, separation and confidentiality of data files between the two enterprises 105(1) and 105(2) may be maintained.

Figure 4:
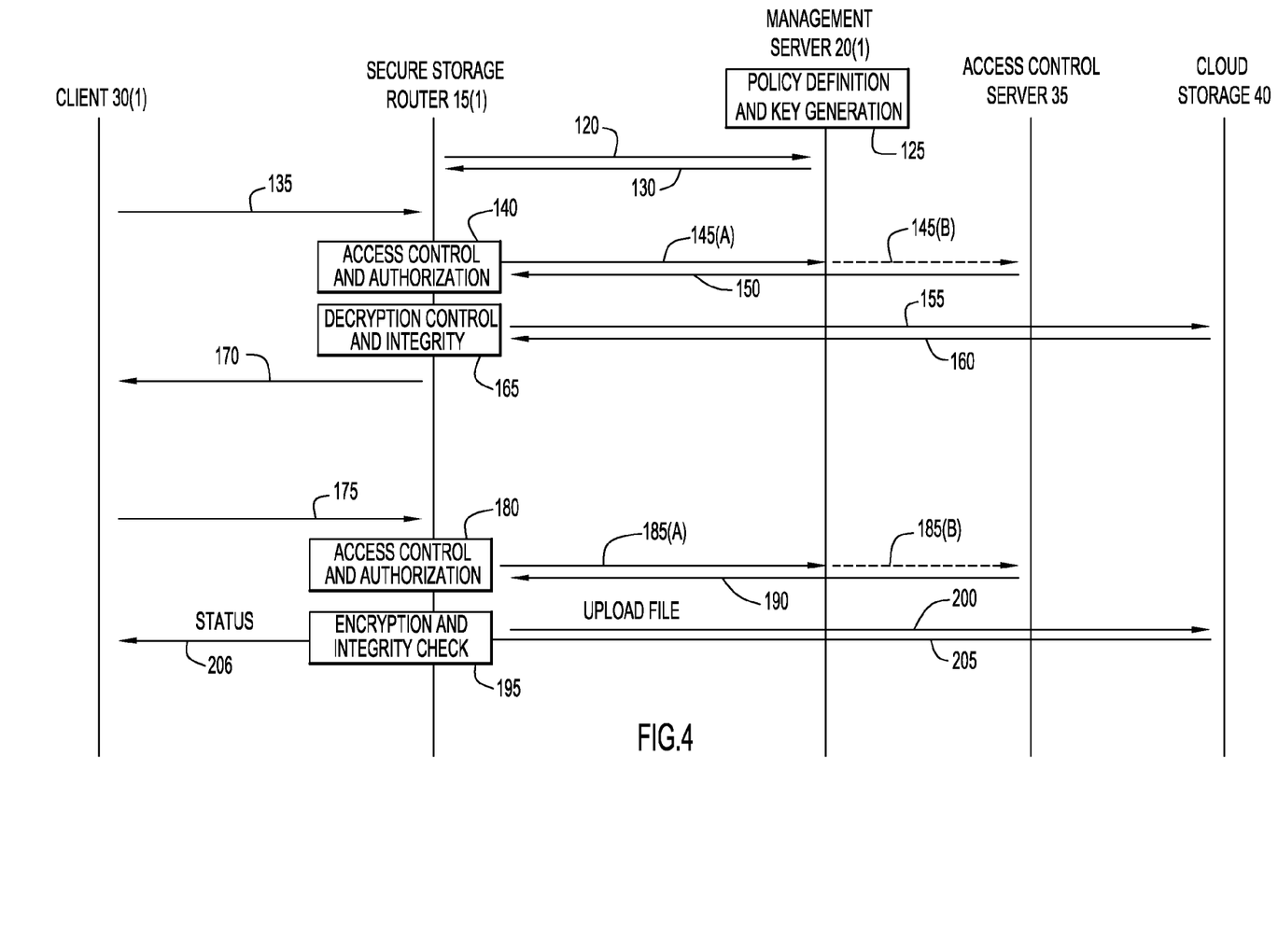
FIG. 4 is a ladder diagram illustrating operations performed in accordance with one group based security technique.

FIG. 4 is a ladder diagram illustrating operations performed in accordance with a group based security technique. For convenience, FIG. 4 will be described with reference to elements of FIG. 1, namely client 30(1), secure router 15(1), management server 20(1), access controller 35 and cloud storage 40.

As noted above, server 20(1) is configured to maintain different sets of security information that may be accessed and used by different groups of network device, referred to herein as access groups. Also as noted, secure router 15(1) is first authenticated and registered to one of these groups by management server 20(1). More particularly, secure router 15(1) generates and forwards a registration request 120 to management server 20(1). Upon receiving this request, at 125 management server 20(1) authenticates secure router 15(1) (i.e., verifies that secure router 15(1) is able and authorized to participate in the security operations). Management server 20(1) also assigns secure router 15(1) to a particular access group, thereby defining/generating security information (security/access polices, encryption keys and other information) for use by secure router 15(1). Management server 20(1) may assign secure router 15(1) to an access group using information in the registration request 120. Alternatively, registration request 120 includes an assertion by secure router 15(1) that the router is entitled to be a member of a particular access group, or is entitled to certain access levels. In such circumstances, management server 20(1) is configured to validate theses assertions and assign secure router 15(1) to the requested group, a different group, or to select a group having the requested access levels.

After authentication and access group assignment, management server 20(1) pushes or downloads the security information 130 associated with the selected access group to secure router 15(1). In other words, management server 20(1) issues the policies and master key for the selected access group. As noted above, in certain circumstances, access control may be delegated by management server 20(1) to access control server 35. In such situations, the download of security information 130 may include a notification that access control has been given to access control server 35.

As previously noted, clients within an enterprise may store data in cloud storage 40 and/or retrieve data from the cloud storage. In FIG. 4, a data read or retrieval request 135 is generated by client 30(1) and is intercepted by secure router 15(1) according to one or more policies contained in the security information received from server 20(1). It would be appreciated that secure router 15(1) is configured to intercept/proxy to a number of different protocols utilized by client 30(1) including, but not limited to, Hypertext Transfer Protocol (HTTP), Hypertext Transfer Protocol Secure (HTTPS), Representation State Transfer protocol (REST), Simple Object Access Protocol (SOAP), File Transfer Protocol (FTP), Network File System (NFS) protocol, Common Internet File System (CIFS) protocol, etc.

At 140, secure router 15(1) applies access control policies contained in the received security information to authenticate client 30(1) (i.e., verifies that client 30(1) is authorized to retrieve the requested data). Secure router 15(1) may implement this access control with the assistance of one of management server 20(1) or access control server 35. In such circumstances, upon intercepting the data retrieval request 135, secure router 15(1) sends a request 145(A) (to management server 20(1)) or a request 145(B) (to access control server 35) requesting that the server verify that client 30(1) is authorized to retrieve the requested data. Management server 20(1) or access control server 35 performs the verification and then issues a response 150 to secure router 15(1).

If the authentication of the client is unsuccessful, the retrieval request is terminated. However, if client 30(1) is allowed to retrieve the data file, secure router 15(1) issues a request 155 to cloud storage 40 for the desired data file. Cloud storage 40 responds by sending an encrypted object 160 that contains the data file to secure router 15(1). At 165, secure router 15(1) decrypts object 165 to extract the desired data file, and may also perform a check of the integrity of the data file. Secure router 15(1) then provides data file 170 to client 30(1).

It is to be appreciated that there are many cloud storage providers using non-standard communication protocols. Secure router 15(1) may be configured to operate with these different protocols. That is, secure router 15(1) is configured to generate and receive messages using different cloud service provider protocols.

As noted above, client 30(1) may also store a data file 175 in cloud storage 40. In such circumstances, data file 175 generated by client 30(1) is intercepted by secure router 15(1). At 180, secure router 15(1) authenticates client 30(1) (i.e., verifies that client 30(1) is authorized to write the requested data file). Secure router 15(1) may authenticate client 30(1) with the assistance of one of management server 20(1) or access control 35. More specifically, upon intercepting the data 175, secure router 15(1) sends a request 185(A) (to management server 20(1)) or a request 185(B) (to access control server 35) requesting that the server verify that client 30(1) is authorized to write the data. Management server 20(1) or access control server 35 performs the verification and then issues a response 190 to secure router 15(1).

If the authentication of the client is unsuccessful, the write request is terminated. However, if client 30(1) is allowed to write the data, at 195 secure router 15(1) generates an integrity check of data 175, and then generates an encrypted object 200 that contains an encrypted version of the data file and other information, including the integrity check. Secure router 15(1) then forwards encrypted object 200 to cloud storage 40. Encrypted object 200 is stored in cloud storage, and remains encrypted while at rest in the cloud storage. Cloud storage 40 will issue a response 205 indicating success or failure of the storage of object 200, and secure router 15(1) will report the status 206 to client 30(1).

Figure 5:
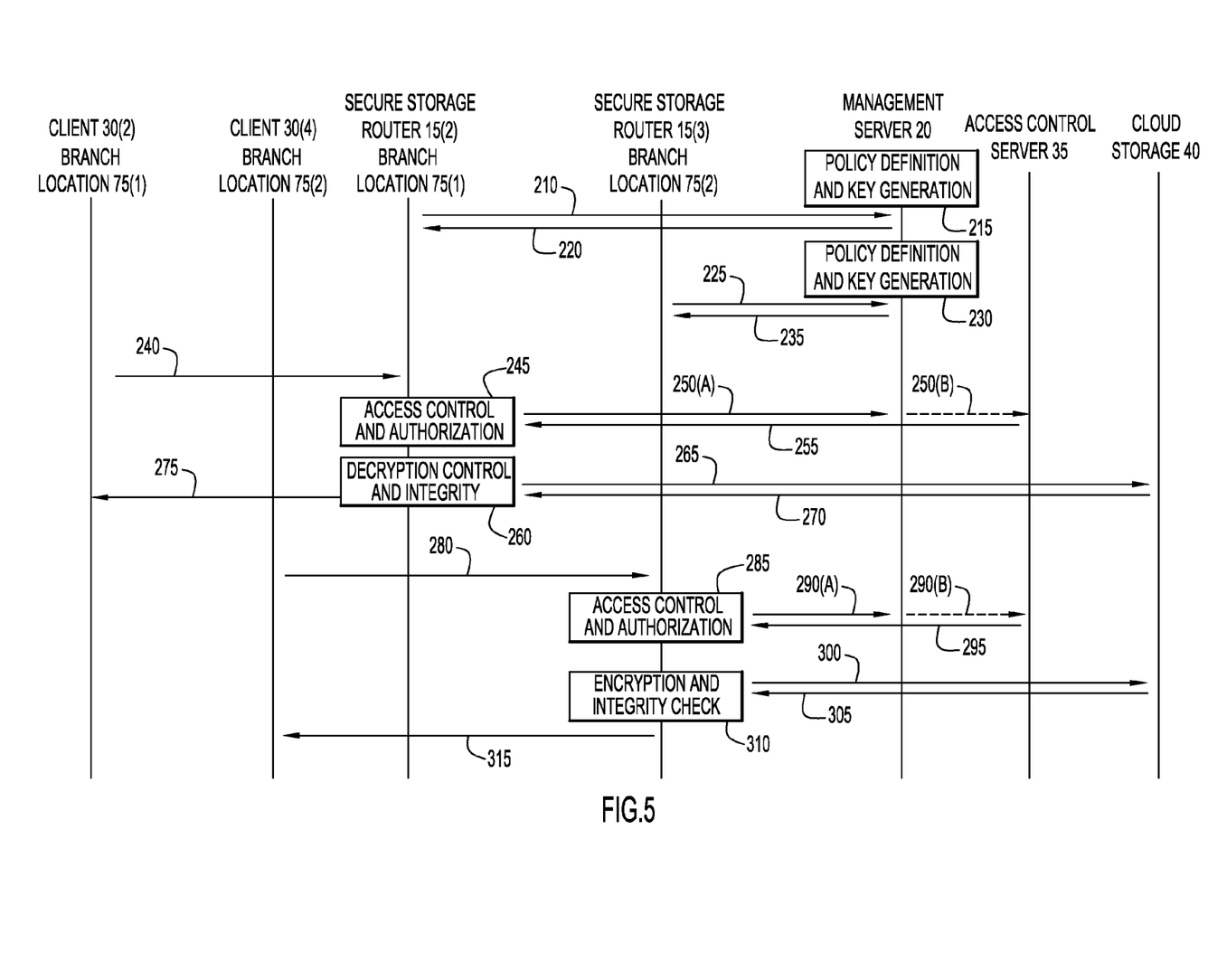
FIG. 5 is a ladder diagram illustrating operations performed in accordance with another group based security technique.

FIG. 5 is a ladder diagram illustrating operations performed in accordance with another group based security technique. For ease of illustration, FIG. 5 will be described with reference to elements of FIG. 2, namely client 30(2) and secure router 15(2) both in branch location 75(1), client 30(4) and secure router 15(3) both in branch location 75(2), management server 20, and cloud storage 40. For the purposes of this example, an access controller 35 is also optionally provided.

As noted above, a management server 20 is configured to maintain different sets of security information that may be accessed and used by different access groups. In the example of FIG. 5, secure routers 15(2)-15(3) each individually register with management server 20 as a member of one of these different access groups. More specifically, secure router 15(2) generates and forwards a registration request 210 to management server 20. At 215, following receipt of this request, management server 20 authenticates secure router 15(2) (i.e., verifies that secure router 15(2) is able and authorized to participate in the security operations). Management server 20 also assigns secure router 15(2) to a particular access group, thereby defining security information for use by secure router 15(2). Management server 20 may assign secure router 15(2) to an access group using information in the registration request 210. Alternatively, registration request 210 includes an assertion by secure router 15(2) that the router is entitled to be a member of a particular access group, or is entitled to certain access levels. In such circumstances, management server 20 is configured to validate theses assertions and assign secure router 15(2) to the requested group, a different group, or to select a group using the requested access levels.

After authentication and access group assignment, management server 20 downloads security information 220 associated with the selected access group to secure router 15(2). In other words, management server 20 issues the policies and master key for the selected access group. As noted above, in certain circumstances, access control may be delegated by management server 20 to access control server 35. In such situations, the download of security information 220 may include a notification that access control has been given to access control server 35.

Similarly, secure router 15(3) generates and forwards a registration request 225 to management server 20. At 230, management server 20 authenticates and assigns secure router 15(3) to one of the access groups as described above with reference to secure router 15(2). Following authentication of secure router 15(3), management server 20 downloads security information to secure router 15(3) in substantially the same manner as described above with reference to secure router 15(2).

As such, each secure router 15(2)-15(3) separately registers with management server 20 and receives security information associated with a particular access group. In the example of FIG. 5, secure routers 15(2)-15(3) are within the same enterprise 70 and are assigned to the same access group. However, in other circumstances, 15(2)-15(3) may be assigned to different access groups. For example, in one example, a multi-tenant or multi-enterprise environment is provided in which each secure router 15(2)-15(3) is associated with a different tenant. As such, secure router 15(2) (associated with tenant 1) is assigned to a first access group while secure router 15(3) (associated with tenant 2) is assigned to a second access group. Because the policies, encryption keys, etc., are different for each access group, confidentiality of data between the tenants may be preserved.

Returning to the example of FIG. 5, client 30(2) may store data in cloud storage 40. In such circumstances, secure router 15(2) intercepts a date file 240 generated by client 30(2) for storage in cloud storage 40. At 245, secure router 15(2) authenticates client 30(2) (i.e., verifies that client 30(2) is authorized to write the requested data) with the assistance of one of management server 20 or access control 35. More specifically, upon receiving the data 245, secure router 15(2) sends a request 250(A) (to management server 20) or a request 250(B) (to access control server 35) requesting that the server verify that client 30(2) is authorized to write the data. Management server 20 or access control server 35 performs the verification and then issues a response 255 to secure router 15(2).

If the authentication of the client is unsuccessful, the write request is terminated. However, if client 30(2) is allowed to write the data, at 260 secure router 15(2) generates an integrity check of data 240, and then generates an encrypted object 265 that contains an encrypted version of the data and other information, including the integrity check. Secure router 15(2) then forwards encrypted object 265 to cloud storage 40. Encrypted object 265 is stored in cloud storage, and remains encrypted while at rest in the cloud storage. Cloud storage 40 will issue a response 270 indicating success or failure of the storage of object 200, and secure router 15(1) may report the status 275 to client 30(2).

As previously noted, clients within an enterprise may also retrieve data files from cloud storage. In FIG. 5, a data file retrieval request 280 is generated by client 30(4) and intercepted by secure router 15(3). At 285, secure router 15(3) authenticates client 30(4) (i.e., verifies that client 30(4) is authorized to retrieve the requested data file) with the assistance of one of management server 20 or access control 35. More specifically, upon receiving the data file retrieval request 280, secure router 15(3) sends a request 190(A) (to management server 20) or a request 190(B) (to access control server 35) requesting that the server verify that client 30(4) is authorized to retrieve the requested data. Management server 20 or access control server 35 performs the verification and then issues a response 295 to secure router 15(3).

If the authentication of the client is unsuccessful, the read request is terminated. However, if client 30(4) is allowed to retrieve the data file, secure router 15(3) issues a request 300 to cloud storage 40 for the desired data file. Cloud storage 40 responds by sending an encrypted object 305 that contains the data file back to secure router 15(3). At 310, secure router 15(3) decrypts object 305 to extract the desired data file, and may perform a check of the integrity of the desired data file. Secure router 15(3) then provides data file 315 to client 30(4).

Figure 6:
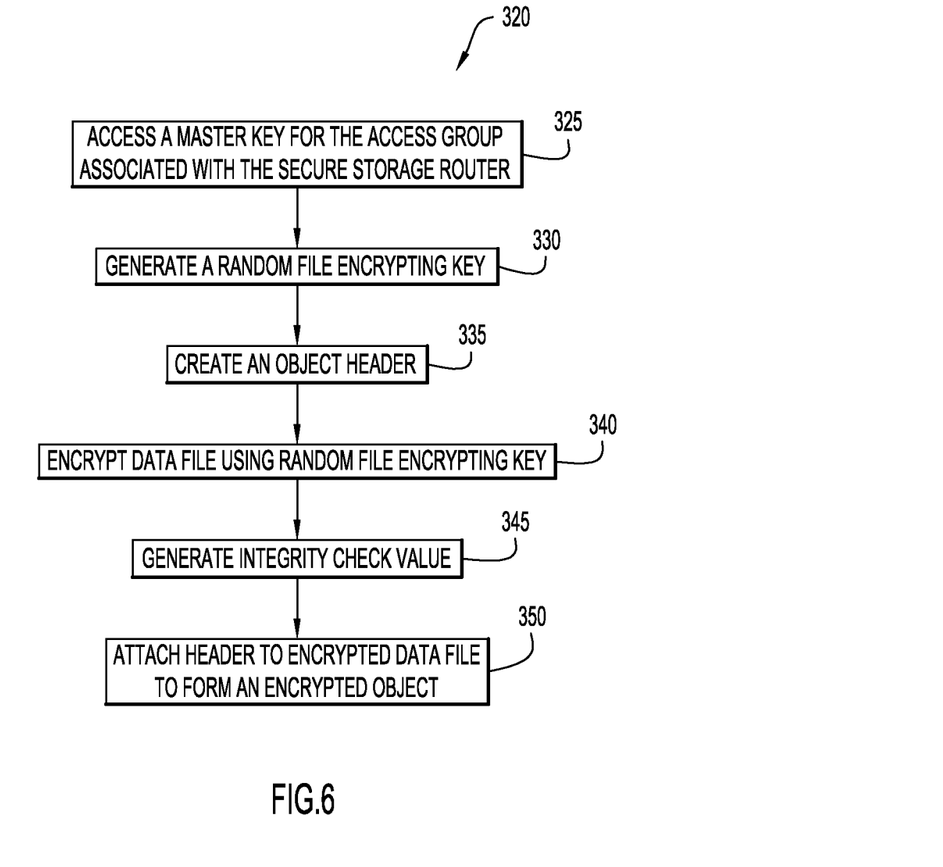
FIG. 6 is a flowchart of a method for generation of an encrypted object in accordance with a group based security technique.
Figure 7:
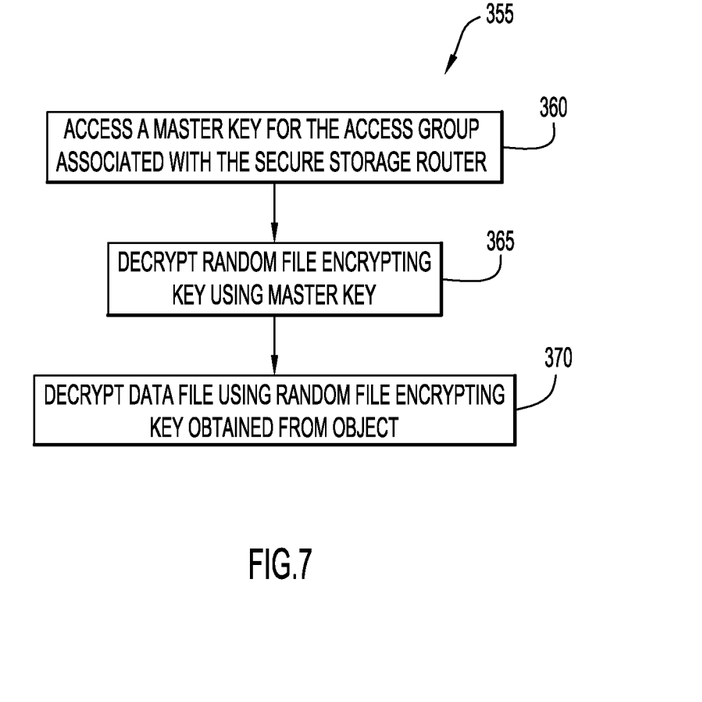
FIG. 7 is a flowchart of a method for decryption of an encrypted object in accordance with a group based security technique.

As previously noted, secure routers, as described herein, are configured to convert data files into encrypted objects for storage in cloud storage, as well as to decrypt such objects retrieved from cloud storage in order to extract desired data there from. FIG. 6 is a flowchart of a method 320 for the conversion of a data file into an encrypted object for storage in cloud storage, while FIG. 7 is a flowchart of a method 355 for the decryption of an object downloaded from cloud storage.

Referring first to FIG. 6, encryption method 320 is performed at a secure router in response to interception of a data file generated by a client. As described above with reference to FIGS. 4 and 5, the encryption operations also occur subsequent to the authentication of the secure router, and assignment thereof to a selected access group. That is, the secure router has previously obtained any specific security information (i.e., access policies, which master key to use, cloud storage location, etc.) from the management server.

At 325, the secure router accesses a master key. This master key is generally part of the download of security information from the management server and, as such, may be stored within memory of the secure router. However, in certain circumstances, the master key may not be on the secure router, and is retrieved from the management server.

At 330, secure router generates a random file encrypting key that, as described below, is used to encrypt the data file received from the client. At 335, the secure router creates a metadata header for attachment to the data file. The header will include an identifier (ID) for the master key and possibly other information. At 340, the data file is encrypted using the random file encrypting key, and the random file encrypting key is encrypted using the master key obtained from the management server. As such, this method includes a two-step encryption process in which the data file is encrypted using the random key, and in which the random key is encrypted using the master key.

An integrity check value, which is a value that allows a secure router to validate the data file during subsequent decryption, is generated at 345 and may be placed as part of the header. At 350, the header, including the encrypted key and the integrity check value, is attached to the encrypted data file to form an encrypted object.

It is appreciated that the content of the encrypted object in the example of FIG. 6 is merely illustrative, and that other formats of the encrypted object are possible. For example, in one form the integrity check value may be omitted, while in other forms additional information may be added. For example, metadata such as Multipurpose Internet Mail Extension (MIME) type, original content length, etc. may also be included.

As noted, a secure router intercepts a request from a client for a data file stored in cloud storage. The secure router authenticates the client, downloads an encrypted object containing the data file from the cloud storage, and extracts the data file from the encrypted object. FIG. 7 is a flowchart of a method 355 performed to extract the data file from the encrypted object.

At 360, the secure router accesses a master key. This master key is generally part of the download of security information from the management server and, as such, may be stored within memory of the secure router. However, in certain circumstances, the master key may not be on the secure router, and is retrieved from the management server. The master key is the same master key that was used during the encryption of the requested data file.

As previously noted, an encrypted object contains an encrypted version of the data file, as well as the random file encrypting key that was used to encrypt the data file. However, the random key is also stored in an encrypted format. As such, at 365, the secure router uses the master key to decrypt the random key. At 370, the secure router uses the decrypted random key to decrypt the data file, and the data file may then be forwarded to the client.

Figure 8:
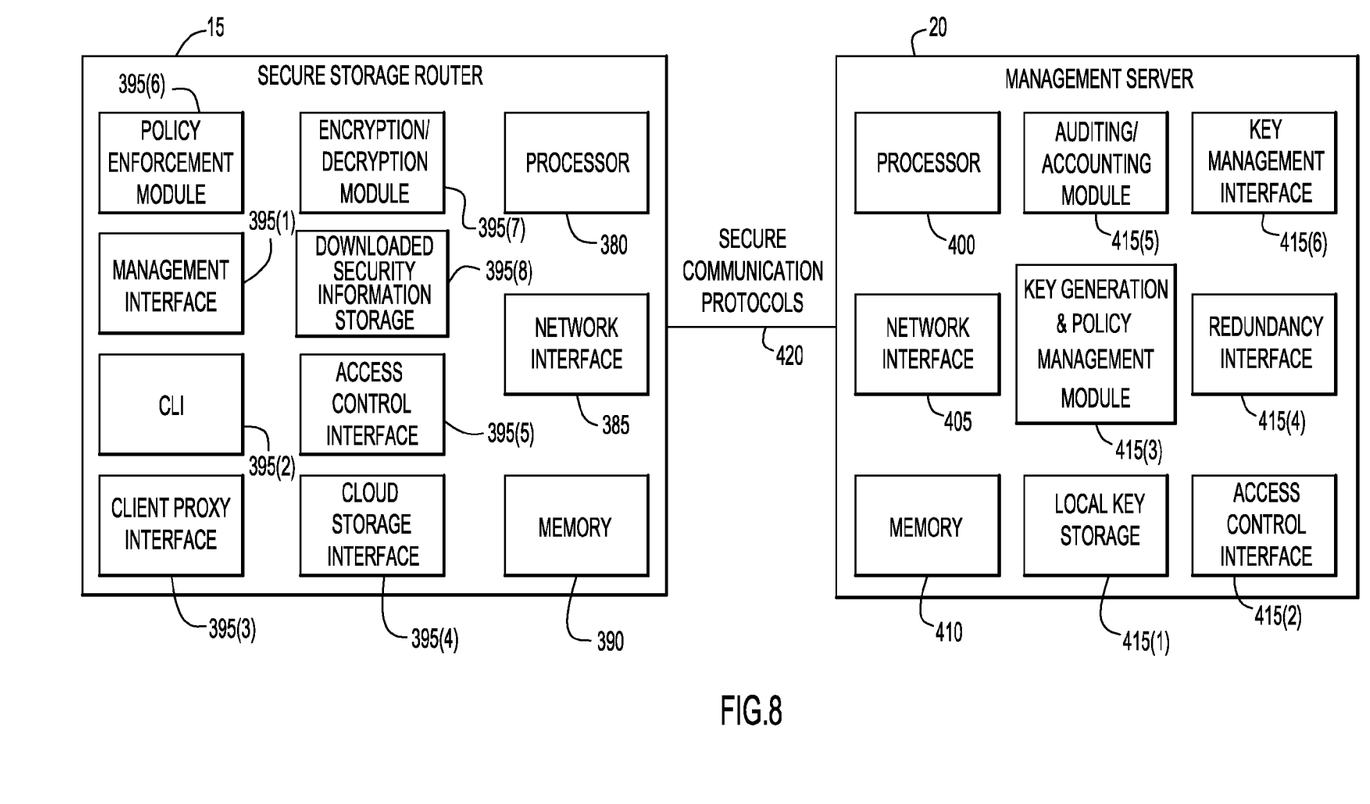
FIG. 8 is a block diagram of an example secure router and an example management server configured to implement a group based security technique.

FIG. 8 is a block diagram of a secure router 15 and a management server 20 that may be implemented in accordance with the concepts described herein. As shown, secure router 15 includes a processor 380, network interface unit 385 and memory 390. Secure router 15 also includes a plurality of additional functional modules 395(1)-395(8). Management server 20 includes a processor 400, network interface unit 405, memory 410 and a plurality of additional functional modules 415(1)-415(6). Secure router 15 and management server 20 communicate using secure communication protocols 420.

Secure router 15 includes a plurality of interfaces that allow the router to operate with other devices or a user. Specifically, secure router 15 includes management interface 395(1), a command-line interface (CLI) 395(2), a client proxy interface 395(3), a cloud storage interface 395(4), and an access control interface 395(5). Client proxy interface 395(3) enables interactions between secure router 15 and clients within an enterprise. Client proxy interface may support a number of different protocols including, but not limited to, HTTP, HTTPS, REST, SOAP, FTP, NFS, CIFS, etc. Similarly, cloud storage interface 395(4) enables interactions associated with storing an encrypted object in, or retrieving an encrypted object from, cloud storage. Cloud storage interface 395(4) may also supports a number of different protocols for communication with different cloud storage providers. Access control interface 395(5) enables interactions between secure router 15 and a management server 20 or an access control server during access control operations.

Secure router 15 also includes a policy enforcement module 395(6), encryption/decryption module 395(7), and downloaded policy/key storage 395(8). As noted above, after registration of secure router 15 with management server 20, the management server downloads security information (access policies, keys, etc.) to the router. This security information is stored in downloaded security information storage 395(8), and later accessed by policy enforcement module 395(6) and encryption/decryption module 395(7). Specifically, access polices are enforced by policy enforcement module 395(6), and encryption/decryption of data files and keys, generation of file encrypting keys, etc. are performed by encryption/decryption module 395(7).

Downloaded security information storage 395(8) on secure router 15 is non-volatile memory that may be part of memory 390, or a separate memory element. Functional modules 395(1)-395(7) may be implemented in combinations of hardware and software. In circumstances in which modules 395(1)-395(7) are implemented, at least in part, in software, the software may be stored in memory 390. The memory 390 may comprise read only memory (ROM), random access memory (RAM), magnetic disk storage media devices, optical storage media devices, flash memory devices, electrical, optical, or other physical/tangible memory storage devices. Modules 395(1)-395(7) may include a microprocessor or microcontroller that executes instructions for the respective functional modules stored in memory 390. Alternatively, processor 380 may execute instructions for the functional modules. Thus, in general, the memory 390 may comprise one or more computer readable storage media (e.g., a memory device) encoded with software comprising computer executable instructions and when the software is executed (by processor 380 or processors in functional modules 395(1)-395(7)) it is operable to perform the operations described herein.

As noted above, management server 20 comprises a plurality of functional modules 415(1)-415(6). More particularly, management server 20 includes an access control interface 415(2) that enables access control operations with secure router 15 and/or an access control server. Management server 20 also includes a redundancy interface 415(4) that allows the management server 20 to exchange keys, policies, metadata, statistics, and other states information with one or more other management servers (not shown in FIG. 8). If management server 20 were to fail, this information allows the other management server(s) can assume the functionality of management serve 20. Also provided is an auditing/accounting module 415(5) that collects and maintains statistics and logs for the system. The collected information may be used to perform summarization, to output real time statistics, to perform data analysis and reporting on the system performance, obtain information regarding usage and debugging of the system, etc. In one example, entries logged by auditing/accounting module 415(5) will include a date/time stamp of when a file was accessed from which user/client. Statistics logged by auditing/accounting module 415(5) may include the number of read/write operations to a particular cloud storage, and/or reports may be generated periodically as to how much data was uploaded to a specific cloud during a predetermined time period. Auditing/accounting module 415(5) may also determine the overall amount of data stored in a particular cloud, and/or perform an analysis of the estimated cost of one cloud storage versus another based on a pricing model (computed by data storage on the cloud and how frequent it was accessed).

In certain aspects, management of keys is performed by management server 20 through a key management interface 415(6) and key generation and policy management module 415(3). Additionally, keys are stored by default in local key storage 415(1). Keys may be secured using an Internetwork Operating System (IOS) password module. The password module encrypts the master keys using a random private key or key derived from a user defined password before saving them to key storage 415(1). In certain circumstances, an external database for keys may otherwise be used, such as database 100 of FIG. 2. Additionally, the keys are securely stored on management server 20 and persist for the lifetime of each object in the cloud that was encrypted with that key.

Furthermore, these techniques provide the optional capability for secure routers 15 to query the management server 20 for key material on an as-desired basis. For example, this query may be used when partial keying material is downloaded with security information.

Local key storage 415(1) on management server 20 is non-volatile memory that may be part of memory 410, or a separate memory element. Functional modules 415(2)-415(6) may be implemented in combinations of hardware and software. In circumstances in which modules 415(2)-415(6) are implemented, at least in part, in software, the software may be stored in memory 410. The memory 410 may comprise ROM, RAM, magnetic disk storage media devices, optical storage media devices, flash memory devices, electrical, optical, or other physical/tangible memory storage devices. Modules 415(2)-415(6) may include a microprocessor or microcontroller that executes instructions for the respective functional modules stored in memory 410. Alternatively, processor 400 may execute instructions for the functional modules. Thus, in general, the memory 410 may comprise one or more computer readable storage media (e.g., a memory device) encoded with software comprising computer executable instructions and when the software is executed (by processor 400 or processors in functional modules 415(2)-415(6)) it is operable to perform the operations described herein.

The techniques described herein provide several advantages, including group based key management and distribution, group based policy management and distribution, distributed group policy enforcement, and distributed encryption. These techniques also provide integrated security services to data at rest through its life cycle in the cloud, including data confidentiality, data integrity, access control, and compliance.

The above description is intended by way of example only.
What is claimed is:
1. A method comprising:
sending an authentication registration request from at least one network device configured to encrypt and decrypt data to a management server that maintains different security information, including one or more access control policies and master keys, associated with each of a plurality of access groups for the management server to authenticate the at least one network device and register the at least one network device to a selected one of the access groups;
in response to the authentication registration request, receiving at the at least one network device from the management server security information, including the one or more access control policies and master keys, associated with the selected access group;

intercepting, with the at least one network device, a data file transmitted to cloud storage from a client in an enterprise computing environment;

after the network device has been authenticated by the management server, authenticating, by the at least one network device, the client to ensure the client has permission to write the data to the cloud storage by accessing authentication information stored in the management server; and converting at the network device, based on the security information including the one or more access control policies and master keys received from the management server, the data file into an encrypted object configured to remain encrypted while at rest in the cloud storage.

2. The method of claim 1, wherein the at least one network device comprises a plurality of distributed secure routers, and further comprising:

sending requests by each of the plurality of secure routers to the management server for authentication and registration to an access group; and receiving, with each of the plurality of distributed secure routers, security information associated with an access group to which each respective network device is registered.

3. The method of claim 1, wherein the data file is requested from the cloud storage by the client through the at least one network device, and further comprising, at the network device:

after the network device has been authenticated by the management server, authenticating, by the at least one network device, the client to ensure the client has permission to read the data file from the cloud storage;

obtaining an encrypted object containing the data file from the cloud storage;

decrypting the encrypted object to extract the data file based on the security information including the one or more access control policies and master keys received from the management server; and providing the data file to the client.

4. The method of claim 3, wherein:

the authenticating, by the at least one network device, comprises authenticating the client prior to obtaining the encrypted object by accessing authentication information stored in an access control server configured by the management server.

5. The method of claim 1, wherein the converting at the network device includes:

generating a random file encryption key;

encrypting the data file using the random file encryption key;

encrypting the random file encryption key using the master key from the management server; and attaching a header including at least the encrypted random file encryption key to the encrypted data file to produce the encrypted object.

6. The method of claim 5, wherein the converting at the network device further includes:

generating an integrity check value for the data file that allows the network device to validate the data file during a decryption operation; and attaching the integrity check value to the header of the encrypted object.

7. A system comprising:

at least one management server configured to maintain different security information, including one or more access control policies and master keys, associated with each of a plurality of access groups; and at least one network device configured to encrypt and decrypt data and to send to the management server an authentication registration request to register the network device to a selected one of the access groups;

wherein the at least one management server is further configured to, in response to the authentication registration request from the at least one network device:

authenticate the at least one network device and register the at least one network device as a member of the selected access group; and send the security information, including the one or more access control policies and master keys, associated with the selected access group to the at least on network device; and wherein the at least one network device is further configured to:

intercept a data file transmitted from a client in an enterprise computing environment to cloud storage external to the enterprise computing environment;

after the network device has been authenticated by the management server, authenticate the client to ensure the client has permission to write the data to the cloud storage by accessing authentication information stored in the management server; and using the security information including the one or more access control policies and master keys received from the management server, convert the data file into an encrypted object configured to remain encrypted while at rest in the cloud storage.

8. The system of claim 7, wherein the at least one network device comprises a plurality of distributed secure routers each configured to receive security information from the management server.

9. The system of claim 8, wherein the management server is configured to authenticate and register each of the distributed secure routers to one of the different access groups.

10. The system of claim 7, wherein a data file is requested from the cloud storage by the client through the at least one network device, and wherein the at least one network device is configured to:

after the network device has been authenticated by the management server, authenticate the client to ensure the client has permission to read the data file from the cloud storage; and obtain an encrypted object containing the data file and to decrypt and send the data file to the client.

11. The system of claim 10, wherein the at least one network device is configured to authenticate the client by accessing authentication information stored in the management server.

12. The system of claim 10, wherein the at least one network device is configured to authenticate the client by accessing authentication information stored in an access control server configured by the management server.

13. The system of claim 7, wherein the at least one network device is in the enterprise computing environment and is configured to intercept the data file before it exits the enterprise computing environment.

14. The system of claim 7, wherein the at least one management server is external to the enterprise computing environment and is hosted by a cloud storage service provider.

15. The system of claim 7, wherein the at least one management server comprises a plurality of distributed management servers.

16. An apparatus comprising:
a network interface unit configured to enable communications over a network and encrypt and decrypt data;
a processor coupled to the network interface unit, and configured to:
  send an authentication registration request from the network interface unit to a management server that maintains different security information, including the one or more access control policies and master keys, associated with each of a plurality of access groups for the management server to authenticate the apparatus and register the apparatus to a selected one of the one or more access groups;
  in response to the authentication registration request, receive via the network interface unit from the management server security information, including one or more access control policies and master keys, associated with the selected access group;
  intercept, via the network interface unit, a data file transmitted to cloud storage from a client in an enterprise computing environment; and
  after the network interface unit has been authenticated by the management server, authenticate, by the at least one network interface unit, the client to ensure the client has permission to write the data file to the cloud storage by accessing authentication information stored in the management server; and
  use the security information including the one or more access control policies and master keys received from the management server to convert the data file into an encrypted object configured to remain encrypted while at rest in the cloud storage.

17. The apparatus of claim 16, wherein the processor is further configured to intercept a request by the client for a data file, after the network interface unit has been authenticated by the management server, authenticate, by the at least one network interface unit, the client to ensure the client has permission to read the data file from the cloud storage, obtain an encrypted object from the cloud storage that contains the data file, decrypt the encrypted object to extract the data file based on the security information including the one or more access control policies and master keys received from the management server, and provide the data file to the client.

18. The apparatus of claim 17, wherein the processor is further configured to authenticate the client prior to obtaining the encrypted object by accessing authentication information stored in an access control server configured by the management server.

19. The apparatus of claim 16, wherein the processor is further configured to:
  generate a random file encryption key;
  encrypt the data file using the random file encryption key;
  encrypt the random file encryption key using the master key from the management server; and
  attach a header including at least the encrypted random file encryption key to the encrypted data file to produce the encrypted object.

20. The apparatus of claim 19, wherein the processor is further configured to:
  generate an integrity check value for the data file that allows the network device to validate the data file during a decryption operation; and
  attach the integrity check value to the header of the encrypted object.

21. One or more non-transitory computer readable storage media encoded with software comprising computer executable instructions and when the software is executed operable to:
  send an authentication registration request from at least one network device configured to encrypt and decrypt data to a management server that maintains different security information, including one or more access control policies and master keys, associated with each of one or more access groups for the management server to authenticate the at least one network device and register the at least one network device to a selected one of the one or more access groups;
  in response to the authentication registration request, receive at the at least one network device from the management server security information, including the one or more access control policies and master keys, associated with the selected access group;
  intercept, with at least one network device, a data file transmitted to cloud storage from a client in an enterprise computing environment;
  after the network device has been authenticated by the management server, authenticate the client to ensure the client has permission to write the data to the cloud storage by accessing authentication information stored in the management server; and
  convert, based on security information including the one or more access control policies and master keys received from the management server, the data file into an encrypted object configured to remain encrypted while at rest in the cloud storage.

22. The computer readable storage media of claim 21, wherein the at least one network device comprises a plurality of distributed secure routers, and further comprising instructions operable to:
  sending requests by each of the plurality of secure routers to the management server for authentication and registration to an access group; and
  receive, with each of the plurality of distributed secure routers, security information associated with an access group to which each respective network device is registered.

23. The computer readable storage media of claim 21, wherein the data file is requested from the cloud storage by the client through the at least one network device, and further comprising instructions operable to, at the network device:
  after the network device has been authenticated by the management server, authenticate, by the at least one network device, the client to ensure the client has permission to read the data file from the cloud storage;
  obtain an encrypted object containing the data file from the cloud storage;
  decrypt the encrypted object to extract the data file based on the security information including the one or more access control policies and master keys received from the management server; and
  provide the data file to the client.

24. The computer readable storage media of claim 23, further comprising instructions operable to:
  authenticate the client prior to obtaining the encrypted object by accessing authentication information stored in an access control server configured by the management server.

* * * * *